United States Patent [19]
Murray

[11] 3,877,862
[45] Apr. 15, 1975

[54] FEEDER FOR MULTI-CAVITY COMPRESSION MOLDING APPARATUS

[75] Inventor: Paul Francis Murray, Philadelphia, Pa.

[73] Assignee: Pennwalt Corporation, Philadelphia, Pa.

[22] Filed: Nov. 16, 1973

[21] Appl. No.: 416,465

[52] U.S. Cl. ............... 425/448; 425/258; 222/404; 141/284; 214/301
[51] Int. Cl. ............................................. B29c 3/04
[58] Field of Search ........... 425/256, 258, 439, 447, 425/448, 126 R; 222/404; 141/284; 214/300–302

[56] References Cited
UNITED STATES PATENTS

| | | | |
|---|---|---|---|
| 2,780,984 | 2/1957 | Kleeman | 222/404 X |
| 2,933,763 | 4/1960 | Alesi | 425/256 X |
| 3,726,626 | 4/1973 | Bromberg | 425/258 X |
| 3,741,699 | 6/1972 | Arpajian | 425/438 X |

Primary Examiner—Francis S. Husar
Assistant Examiner—David S. Safran
Attorney, Agent, or Firm—Edward A. Sager

[57] ABSTRACT

Apparatus for feeding thermosetting material into multi-cavity compression molding presses includes a plurality of tiltable troughs which are reciprocable from a loading position where they are charged to a dispensing position where they discharge their contents into the cavities. During discharge the troughs are automatically rotated through 180° to dump their contents, usually plasticized preformed masses.

5 Claims, 5 Drawing Figures

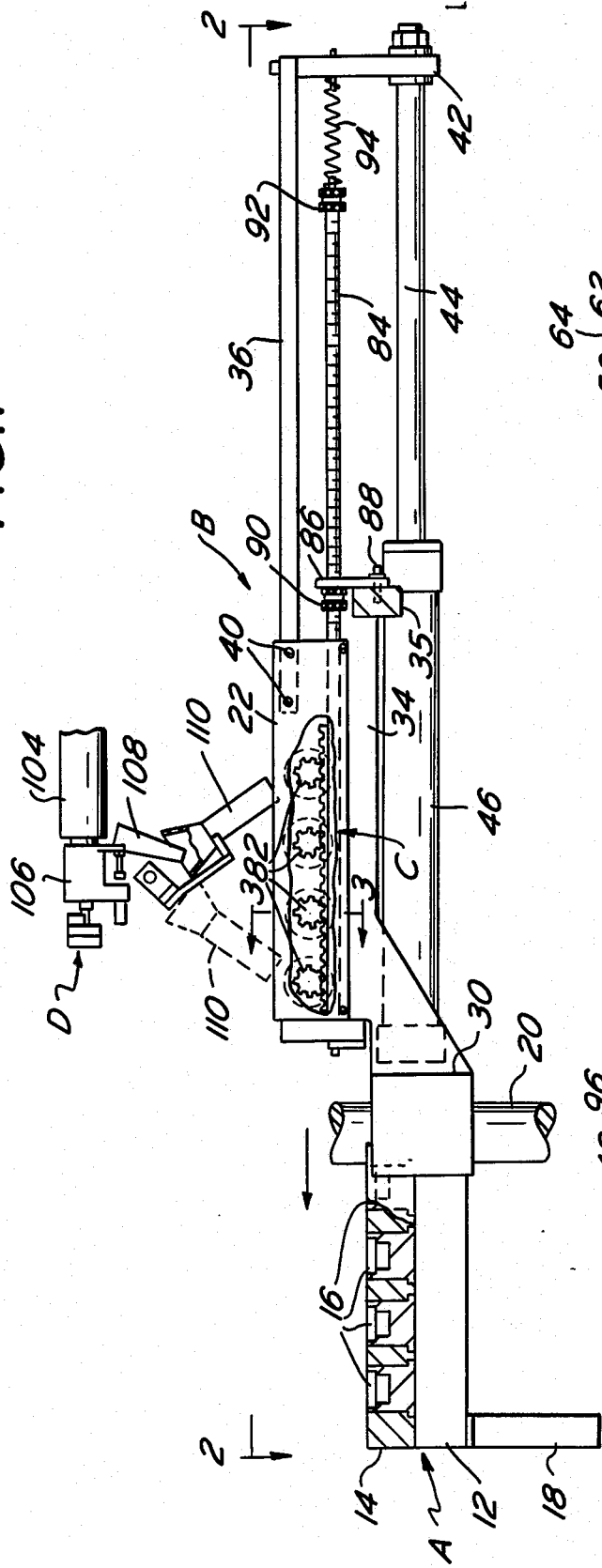

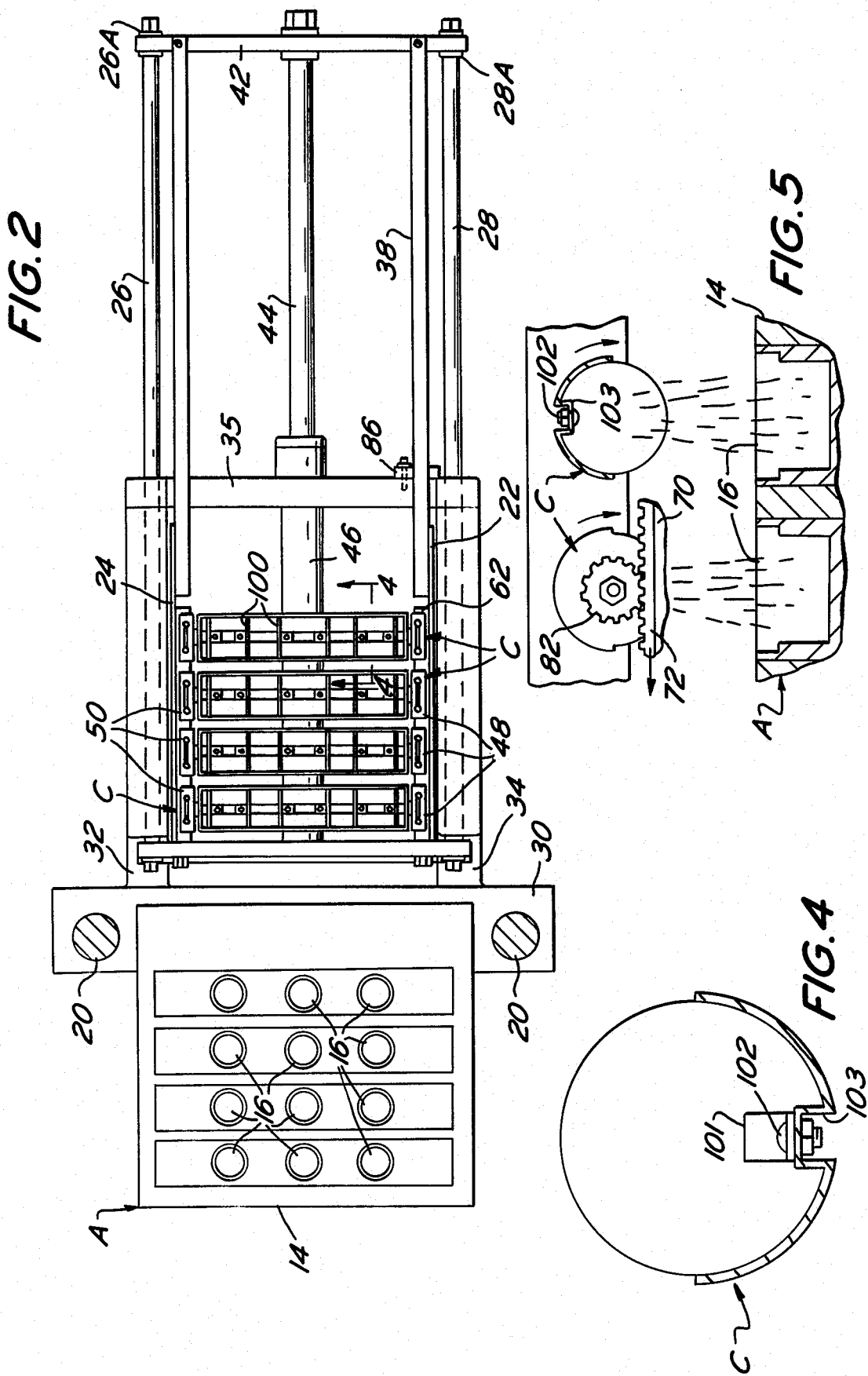

FEEDER FOR MULTI-CAVITY COMPRESSION MOLDING APPARATUS

This invention relates to plastic molding presses, and more particularly relates to feeding apparaus for dispensing charges of plastic materials to multi-cavity compression molding machines.

In automatic compression molding operations molding compounds usually in granular form, are fed to the cavities by means of a feedboard which is reciprocable between a loading position and a dispensing or discharging position. The feedboard includes a plurality of cylindrical apertures or feedtubes therein which are arranged in rows and files corresponding to the cavities in the bottom mold half. When the feed tubes are in registration with the cavities, a slide plate situated directly below the tube apertures and having openings corresponding in size and pattern geometry to that of the apertures is displaced so that openings are aligned with the apertures whereby the contents of the feedtubes are discharged into the mold cavities. However, a serious problem can result in the use of the feedboard system when the spacing between the mold cavities becomes relatively small while the size of the cavities themselves is somewhat large. That is, the distance between the feedtubes must be equal to or greater than the diameter of the tubes because otherwise the openings in the slide or shut-off plate would overlap adjacent feedtubes thereby making complete shut-off impossible so as to be ineffectual.

It is therefore an object of this invention to provide a feeder for multi-cavity compression molding machines which will accommodate a greater number of mold cavities within a given area.

Another object of this invention is to provide a compression molding press feeding apparatus which is adaptable to existing transfer equipment without requiring feedboards, tubes or shut-off plates.

Still another object of this invention is to provide a compression molding press feeding apparatus in which either powder or preformed masses of resin can be transfered to the mold cavities.

Other objects of this invention are to provide an improved device of the character described which is easily and economically produced, sturdy in construction, and highly efficient and effective in operation.

With the above and related objects in view, this invention consists of the details of construction and combination of parts as will be more fully understood from the following detailed description when read in conjunction with the accompanying drawings in which:

FIG. 1 is a side elevational view, and partly broken away, of a feeder embodying this invention for automatically dispensing thermosetting resinous material to multi-cavity compression molding machines.

FIG. 2 is a sectional view taken along lines 2—2 of FIG. 1.

FIG. 3 is a sectional view taken along lines 3—3 of FIG. 1.

FIG. 4 is a sectional view taken along lines 4—4 of FIG. 2.

FIG. 5 is a fragmentary sectional view showing the feeder in mold charging position.

Referring now in greater detail to the drawings in which similar reference characters refer to similar parts, there is shown a feeding device for a multi-cavity compression molding press A comprising a horizontally reciprocable frame, generally designated as B, and a plurality of trough members C mounted in the frame and adapted to rotate 180° in order to dump their charge into the cavities of the press.

The molding press A is generally conventional and includes a stationary platen 12 upon which is secured a mold 14 having a plurality of cavities 16 formed therein in a series of regular rows and files. The stationary platen 12 is affixed to a base (not shown) by way of a plurality of upstanding guide posts 18 and 20. A movable platen (not shown) having a force plate (not shown) with complementary portions to the cavities 16 is vertically reciprocable on the guide posts 20 into closed aligned disposition upon the lower mold half. When molding powder or preformed plasticized masses are charged into the cavities 16 and the mold is closed, molded thermoplastic or thermosetting components can be simultaneously formed.

The reciprocable frame B includes a pair of lateral support members 22 and 24 which are longitudinally slidable on stationary guide rods 26 and 28. The guide rods 26 and 28 are affixed to the frame B by way of bracket 30 secured about the posts 20 and legs 32 and 34 projecting rearwardly therefrom. Transverse piece 35 joins the rear ends of legs 32 and 34. The support members 22 and 24 are fixedly attached to bars 36 and 38 by means of bolts 40. A crosspiece 42 is bolted to the rearward ends of the bars 36 and 38 and carries slide bearings 26a and 28a which are slidably guided on the respective rods 26 and 28. Drive rod 44 is coupled to the center of crosspiece 42 and is actuated by a piston contained within oil cylinder 46.

Bracket plates 48 and 50 are adjustably suspended inboard of the support members 22 and 24 by means of intermediate bar members 60 and 62 and machine screws 64. See FIG. 3. A slide block 66 is affixed to the lower interior portion of support member 22 by screws 68. Longitudinally slidable within the block 66 is a slide bar 70 carrying a rack 72 affixed to its upper surface. A plurality of longitudinally spaced bearings 74 and 76 are retained in the respective plates 48 and 50, these bearings rotatably supporting trunnions 78 and 80 projecting outboard of the troughs C. Pinion gears 82 affixed to the trunnions 78 intermesh with the longitudinally slidable rack 72.

Referring now to FIG. 1, a threaded rod 84 is engaged within a tapped bore (not shown) within slide block 70 and projects rearwardly threrefrom through an aperture within stop 86. The stop 86 is affixed to transverse piece 35 by stud bolt 88. Collars 90 and 92 threadedly engage threaded rod 84 and act as adjustable position stops for the rearward (loading) and advancing (dumping) motion of the troughs C. Spring 94 attached to crosspiece 42 and the tail of the threaded rod 84 acts to bias the latter, and hence the rack 72, to the right as shown in FIG. 1.

Referring now to FIGS. 3, 4 and 5, the troughs C each comprise a longitudinally extending member which is U-shaped in cross section and including end walls 96 and 98. A plurality of trough side plates 100 are adjustably secured to the bottom of the troughs C by means of elbows 101 and bolts 102, the latter being attached within a groove 104 at the bottom. The side plates 100 define separators for aligning the preform or resin powder material contained therein with the cavities 16.

As is apparent from the foregoing description, the feed frame B is reciprocable between a charging position in which the troughs are upright to a dumping position in which the troughs are inverted over the cavities. Charging position is demonstrated in FIGS. 1 and 2 wherein the troughs C are moved to the right and under a charging hopper or a preform dispenser D, such as is shown in prior U.S. Pat. Nos. 3,741,699 or 3,661,485. The preforming device D comprises a series of extruders 104 which preplasticizes molding powder and expresses the extrusions into cups 106 so as to form compressed heated masses. A cutting knife severs the compressed masses causing them to fall into a chute 108 and a set of pivotally supported feed tubes 110 directs the masses into one of the troughs C at a time. With the troughs C loaded and the press A open, oil actuated cylinder 46 is urged to the left whereupon the feed frame B is moved over the mold 14. However, just prior to reaching the final position over the molds, collar nut 92 on threaded rod 84 engages stop 86. At this stage, the support members 22 and 24 override the slide 70 causing relative motion between the rack 72 and the feed frame B. Therefore, the gears 82 are rotated so as to invert the troughs C on their trunnions 78 and 80. Accordingly, the contents of the troughs C are dumped into the mold cavities 16 now situated immediately below and in registration therewith. The cylinder 46 is now actuated to move drive rod 44 and feeder frame assembly B to the right. As the threaded rod 84 and its collar 92 are withdrawn, the rack 72 moves with respect to the frame B thereby causing rotation of the gears 82 to upright the troughs C preparatory to recharging them with molding resin.

This dumping can also be accomplished by a separate actuating means after the feeder B has reached the full advanced position and is over top of cavities. For example, a small hydraulic cylinder can actuate the rack 70 to dump, and then upright the troughs C by reciprocating in the opposite direction.

Although this invention has been described in considerable detail, such description is intended as being illustrative rather than limiting, since the invention may be variously embodied without departing from the spirit thereof and the scope of the invention is to be determined as claimed.

What is claimed is:

1. Apparatus for feeding preformed masses of plastic material into multi-cavity compression molding presses, comprising:
    a frame,
    a plurality of horizontally spaced troughs rotatably supported in said frame,
    means for compartmentalizing said troughs in correspondence with the mold cavities,
    means for reciprocating said frame from a loading position in which the preformed masses are dispensed into said troughs to a discharging position in which the troughs are located over the mold cavities, and
    means for rotating said troughs through 180° to dump the preformed masses into the mold cavities when said frame is in the discharging position.

2. The apparatus of claim 1 wherein said means for compartmentalizing comprise partition plates laterally spaced from each other by a distance corresponding to the width of the mold cavities.

3. The apparatus of claim 2 wherein said partition plates are laterally adjustable.

4. The apparatus of claim 1 wherein said means for rotating said troughs comprises a rack and pinion.

5. The apparatus of claim 4 wherein said rack is actuated by a stop at a predetermined position during advancement of said frame.

* * * * *